United States Patent [19]

Kajiyama et al.

[11] Patent Number: 4,614,692
[45] Date of Patent: Sep. 30, 1986

[54] FUEL CELL ELECTRODE, PROCESS FOR PRODUCING THE SAME AND FUEL CELL USING THE SAME

[75] Inventors: Hiroshi Kajiyama; Tetsuro Minemura; Hisashi Ando; Kiyoshi Konno, all of Hitachi, Japan

[73] Assignee: Hitachi, Ltd., Tokyo, Japan

[21] Appl. No.: 719,080

[22] Filed: Apr. 2, 1985

[30] Foreign Application Priority Data

Apr. 2, 1984 [JP] Japan .................................. 59-63376
Apr. 3, 1984 [JP] Japan .................................. 59-66558

[51] Int. Cl.$^4$ ............................................. H01M 4/86
[52] U.S. Cl. ................................... 429/44; 252/182.1; 427/115
[58] Field of Search ...................... 429/44, 40, 41, 42, 429/43, 45; 252/182.1; 427/115, 113

[56] References Cited

U.S. PATENT DOCUMENTS

| | | | |
|---|---|---|---|
| 4,293,396 | 10/1981 | Allen et al. | 429/44 X |
| 4,369,104 | 1/1983 | Beckley | 429/44 X |
| 4,407,905 | 10/1983 | Takeuchi et al. | 429/44 X |
| 4,407,906 | 10/1983 | Stonehart | 429/44 X |
| 4,430,391 | 2/1984 | Ovshinsky et al. | 429/40 |

OTHER PUBLICATIONS

Kagoku (Chemistry), vol. 38, No. 4, pp. 268-278 (1983).

*Primary Examiner*—Charles F. LeFevour
*Attorney, Agent, or Firm*—Antonelli, Terry & Wands

[57] ABSTRACT

A fuel cell electrode having a structure wherein at least one catalytic active component selected from noble metals belonging to the groups I and VIII in the periodic table is carried on surfaces and among lamellar crystalline layers of a donor-type graphite intercalation compound, is effective for improving cell performance when used in a fuel cell.

22 Claims, 11 Drawing Figures

FUEL CELL ELECTRODE, PROCESS FOR PRODUCING THE SAME AND FUEL CELL USING THE SAME

BACKGROUND OF THE INVENTION

This invention relates to a fuel cell electrode, a process for producing the same and a fuel cell using the same. The fuel cell electrode of this invention is particularly suitable for liquid fuel cells using a liquid fuel such as methanol, hydrazine, etc., and phosphoric acid electrolyte fuel cells.

In the liquid fuel cells using methanol or hydrazine as a fuel or the phosphoric acid fuel cells using phosphoric acid as an electrolyte, electrodes are generally constructed by forming an electrode catalyst layer on a porous electroconductive substrate such as carbon paper, etc. Thus, the electrodes take a double structure of the porous electroconductive plate and the electrode catalyst layer. The electrode catalyst is obtained by carrying one or more catalytic active components on electroconductive particles such as graphite particles. The electrodes having such a structure are usually produced by coating the electrode catalyst on the porous electroconductive substrate by using as a binder a waterrepellent substance such as polytetrafluoroethylene. Since the electrode catalyst layer is formed on the electroconductive substrate via the coating step using the binder, there are problems in that the electrode catalyst layer is easily cracked and easily peeled off from the substrate.

Japanese Patent Appln. Kokai (Laid-Open) No. 124864/82 discloses an fuel cell electrode having such a structure as prior art technology. It also describes that the electroconductivity of the catalyst layer is so bad that a drop in voltage cannot be ignored. In order to improve the electroconductivity of electrode catalyst layer, this reference discloses the formation of the substrate by using a graphite intercalation compound obtained by intercalating an acid such as sulfuric acid, phosphoric acid, or the like among graphite crystalline layers.

SUMMARY OF THE INVENTION

It is an object of this invention to provide a fuel cell electrode having better cell performance than the electrode obtained by coating an electrode catalyst on a porous electroconductive substrate.

It is another object of this invention to provide a process for producing a fuel cell electrode carrying a catalytic active component on a substrate without including a coating step of a binder.

It is a further object of this invention to provide a fuel cell using the fuel cell electrode of this invention therein.

This invention provides a fuel cell electrode comprising at least one catalytic active component selected from noble metals belonging to the groups I and VIII in the periodic table carried on surfaces and among lamellar crystalline layers of a porous electroconductive substrate made of graphite.

This invention also provides a process for producing a fuel cell electrode which comprises contacting a porous electroconductive substrate made from a donor-type graphite intercalation compound with at least one catalytic active component selected from noble metals belonging to the groups I and VIII in the periodic table so as to carry the catalytic active component on surfaces and among lamellar crystalline layers of the graphite by ion exchange reaction or reduction of the catalytic active component.

This invention further provides a fuel cell comprising a pair of electrodes positioned oppositely, an electrolyte disposed between both the electrodes, a fuel chamber placed neighboring to a fuel electrode of the pair of electrodes, an oxidant chamber placed neighboring to an oxidant electrode of the pair of electrodes, a fuel supplying means to the fuel chamber, and an oxidant supplying means to the oxidant chamber, characterized in that at least one of the electrodes comprises at least one catalytic active component selected from noble metals belonging to the groups I and VIII in the periodic table carried on surfaces and among lamellar crystalline layers of a porous electroconductive substrate made of graphite.

DESCRIPTION OF THE PREFERRED EMBODIMENTS

The fuel cell electrode of this invention has a structure wherein at least one catalytic active component selected from noble metals belonging to the group I, particularly Ib such as Au, Ag, etc. and the group VIII such as Ru, Rh, Pd, Os, Ir, Pt, etc., is carried on surfaces and among lamellar crystalline layers of a porous electroconductive substrate made of graphite having lamellar crystalline layers.

The electrode having such a structure can be produced by the following steps. First, a porous electroconductive substrate is made of graphite having lamellar crystalline layers. Then, one or more alkali metals and alkaline earth metals are intercalated among layers of graphite lamellar crystals to produce a donor-type graphite intercalation compound (hereinafter referred to as "donor-type GIC"). The donor-type GIC is immersed in an organic solvent dissolving at least one salt of metal having a catalytic activity selected from metals belonging to the group Ib of the periodic table such as Au and Ag and group VIII of the periodic table such as Ru, Rh, Pd, Os, Ir, Pt, etc. By this, the intercalant, that is, the alkali metal or alkaline earth metal in the GIC and the metal having catalytic activity ionized in the organic solvent are subjected to ion exchange so as to carry the metal having catalytic activity among lamellar crystalline layers of graphite. Further, the above-mentioned metal salt having catalytic activity is reduced and carried on surfaces of the porous electroconductive substrate.

The electrode having such a structure as carrying the catalytic active component by using the ion exchange reaction or reduction reaction and using the graphite intercalation compound as starting material have advantages in that the particle size of catalytic active component is small and the dispersibility of the catalytic active compound is good compared with a known electrode obtained by coating an electrode catalyst on a porous electroconductive substrate using a binder. Therefore, the catalytic active component carried on the substrate can be applied effectively in the cell reaction.

Methanol fuel cells, hydrazine fuel cells, and phosphoric acid electrolyte fuel cells using the electrode of this invention can have higher cell voltage than fuel cells having electrodes obtained by coating electrode catalysts on porous electroconductive substrates.

As a result, it becomes possible to save the amount of catalytic active components.

Intercalation compounds are explained in detail in Kagaku (Chemistry) vol. 38, No. 4, pages 268-278 (1983) by Tsuyoshi Nakajima under the title of "Intercalation Compounds Now in Current Topics". This reference also refers to graphite intercalation compounds.

As disclosed in this reference, the intercalation compound comprises a lamellar substance and an intercalant and can be divided into a donor-type compound and an acceptor-type compound.

The graphite intercalation compound is obtained by combining graphite which is a lamellar substance with an intercalant by ionic bonding. Graphite has a structure of laminated planes of hexagonal network of carbon atoms and one or more intercalants are intercalated among carbon planes.

As the intercalant forming intercalation compounds with graphite, there can be used alkali metals, alkaline earth metals, halogens, halides and acids.

When alkali metals and/or alkaline earth metals are used as intercalant, donor-type GICs are formed. When the other intercalants are used, acceptor-type GICs are formed. The graphite intercalation compounds (GICs) disclosed in Japanese Patent Appln Kokai (Laid-Open) No. 124864/82 are acceptor-type GICs, since acids are used as intercalant.

The acceptor-type GIC is stable in the atmosphere. In Japanese Patent Appln Kokai (Laid-Open) No. 124864/82 the acceptor-type GIC is used as porous electroconductive substrate by effectively using its property of stability in the atmosphere and coating electrode catalysts on the substrate by using a binder.

In contrast, the donor-type GIC is unstable in the atmosphere and easily changes its properties by easily reacting with oxygen or moisture in the atmosphere when contacted.

The present inventors have found that when a donor-type GIC is contacted with an ionized catalyst element in an inert gas or in a liquid which does not substantially react with the donor-type GIC, the catalyst element can be carried on surfaces and among layers of graphite by ion exchange reaction between the GIC and the ionized catalyst element and reduction of the catalyst element by charge transfer. That is, the present inventors have found that the donor-type GIC acts as a reducing agent in the carrying of catalytic active components.

The acceptor-type intercalation compound does not act as a reducing agent. The action as a reducing agent for GICs is specific to the donor-type GIC. Therefore, the donor-type GIC is used as starting material.

According to this invention, the catalytic active component can directly be carried on graphite without using a binder. Therefore, there arises no problem of generating cracks on the catalyst layer unlike the electrodes of prior art obtained by coating the catalyst using a binder.

Further, according to this invention, since the catalytic active component is carried on the surfaces and among crystalline layers of graphite by the ion exchange reaction and the reduction, the bonding is remarkably strong and there is no problem of peeling.

In addition, according to the prior art electrodes, it is necessary to carry the catalytic active component previously on the electroconductive carrier such as graphite particles, followed by coating of this on the porous electroconductive substrate. But according to this invention, such a carrier can be omitted.

The fuel cell electrode of this invention has a structure wherein intercalants in the donor-type GIC is replaced by the catalytic active component by the ion exchange reaction. Therefore, the electrode of this invention has a single-layer structure compared with the double-layer structure of the prior art electrodes.

The fuel cell electrode of this invention has smaller electrode constituting elements than the prior art electrodes. Therefore, it becomes possible to make the electrode thinner. Further, in this invention, since the graphite which is a lamellar substance forms both the current collecting portion and the catalyst carrying portion, the resulting electrode can have good catalytic activity and low electrical resistance properties at the same time.

In this invention, the shape of fuel cell electrode can be made by using graphite. Therefore, it is preferable to form a porous substrate having the desired shape by molding graphite previously. The thickness of the porous substrate may be the same or slightly thinner compared with that of prior art catalyst coated electrode. The thickness of about 0.1 to 2 mm is sufficient.

The porous electroconductive substrate of graphite is preferably obtained by molding using carbon fibers. It is preferable to use carbon fibers having a diameter of 1 $\mu m \pm 0.5$ $\mu m$. The length of carbon fibers is not critical and may be short fibers of about 2 to 3 mm long or long fibers. The carbon fibers are most preferably made by using pitch as a starting material. The intercalation compounds obtained by using pitch are easy in intercalating intercalants and removing intercalants.

In order to produce the porous electroconductive substrate from carbon fiber, there can be used carbon fiber non-woven fabrics, carbon fiber woven fabrics, etc. When non-graphitized carbon fiber is used, the porous electroconductive substrate may be molded after graphitizing the carbon fiber or the porous electronconductive substrate may be molded first by using non-graphitized carbon fiber, followed by graphitization.

It is also possible to use carbon powder in place of carbon fiber. In this invention, the term "graphitization" means graphitization of whole or surface layer of carbon fiber or carbon powder.

The graphitized substrate is made porous in order to pass a fuel or oxidant through the holes. It is preferable to make the pore size 1 to 50 μm and the porosity 85 to 95%.

As the catalytic active component, there are known various catalytic active components. Among them, noble metals belonging to the group I, preferably the group Ib, and the group VIII of the periodic table are preferable in this invention. Examples of such noble metals are ruthenium (Ru), rhodium (Rh), palladium (Pd), osmium (Os), iridium (Ir), platinum (Pt), gold (Au), silver (Ag), etc. These metals can be used alone or as a mixture thereof, in the form of a metal or salts thereof such as chlorides, nitrates, and the like.

The catalytic active component is carried on the substrate preferably in an amount of 0.1 to 2 mg per cm$^2$ of apparent surface area of the electrode.

According to this invention, almost the same cell performance as the prior art cell having the catalyst coated electrodes can be obtained by the catalytic active component carrying amount of ½ or less as small as that required for the prior art electrodes.

The electrode of this invention carrying the catalytic active component among lamellar crystalline layers and on surfaces of graphite can be produced by contacting a donor-type GIC used as a substrate with an ionized catalytic active component, and conducting an ion exchange reaction and a reduction reaction so as to carry the catalytic active component on the substrate.

The ion exchange reaction and the reduction reaction are preferably carried out in an inert gas or in a solution, since the donor-type GIC is unstabe in the atmosphere.

The shape of porous electroconductive substrate is not limited and can be selected optionally. The catalyst element can be carried on the surfaces and among the lamellar crystalline layers of graphite uniformly even if any shapes are taken.

In the fuel cell electrode of this invention, it is remarkably effective to conduct water repellent treatment on the surfaces of electrode, particularly the surface at the side of the electrolyte. In such a case, a care should be taken so as not to conduct the water repellent treatment on the surface of catalytic active component.

In order to prevent the catalytic active component surface from the water repellent treatment, it is preferable to conduct the water repellent treatment before the carrying of catalytic active component on the substrate. As a process for attaining such a purpose, it is desirable to immerse the graphite intercalation compound in a liquid dispersing a water repellent substance. As the water repellent substance, polytetrafluoroethylene is preferable.

After the water repellent treatment, the catalytic active component can be carried at least among lamellar crystalline layers of graphite substrate by contacting the ionized catalytic active component with the graphite substrate.

A water repellent treated fuel cell electrode can be produce by, for example, the following process. A porous electroconductive substrate made from carbon fiber woven fabric or carbon fiber non-woven fabric, at least carbon fiber surface having been graphitized, is immersed in a poytetrafluoroethylene solution. The resulting porous electroconductive substrate is subjected to intercalation of an alkali metal or alkaline earth metal at the surface portion of graphite of individual carbon fibers to give a donor-type graphite intercalation compound. The donor-type graphite intercalation compound is contacted with an ionized catalytic active component to carry the catytic active component on the surfaces and among lamellar crystalline layers of graphite while conducting an ion exchange reaction and a reduction reaction. When the catalytic active component is carried on the surfaces and among lamellar crystalline layers of graphite, the donor-type graphite intercalation compound is immersed in a solution obtained by dissolving one or more metal salts having catalytic activity in an organic solvent such as tetrahydrofran, dimethoxyethylene, etc.

The donor-type graphite intercalation compound can be produced, for example, as follows. In a vessel, carbon fiber at least the surface of which is graphitized and an intercalant such as an alkali metal or alkaline earth metal are placed with mixing together or separately in different positions in the vessel. Then, the vessel is sealed in vacuum of 10$^{-3}$ Torr or less. In such a case, the alkali metal or alkaline earth metal may be a single metal, a mixture of different kinds of metals, or an alloy. Then, the vessel is put in an electric furnace for heat treatment. When the carbon fiber at least the surface of which is graphitized and the alkali metal or alkaline earth metal are mixed together and placed in the vessel, it is preferable to heat the whole vessel at the same temperature. When the carbon fiber and the alkali metal or alkaline earth metal are placed in different positions in the vessel, it is preferable to control the temperature of the carbon fiber placed position and the temperature of the alkali metal or alkaline earth metal placed position separately. In the latter case, a donor-type graphite intercalation compound having the desired stage number can be produced by making the temperature difference between the carbon fiber placed position and the alkali metal or alkaline earth metal placed position 50 to 300° C. Either the temperature of the carbon fiber placed position or the temperature of the alkali metal or alkaline earth metal placed position can be made higher. In any cases, the heating temperature at high temperature portion is preferably 200° to 700° C.

The stage number is a parameter showing an anisotropic orientation type structure of an intercalant at the time of forming a donor-type intercalation compound by inserting the intercalant such as an alkali metal or alkaline earth metal between hexagonal layer planes of graphite crystals. The first stage means that the intercalant is coordinated or inserted between the hexagonal layer planes at intervals of one plane, and the third stage means that the intercalant is coordinated or inserted between the hexagonal layer planes at intervals of three planes.

When the whole vessel is heated at the same temperature, it is preferable to add the intercalant in an amount slightly larger than the stoichiometric amount of the donor-type graphite intercalation compound having the desired stage number, since the mixing ratio of the intercalant and the carbon fiber influences properties of the product.

The donor-type graphite intercalant compound is stable in an inert gas, but is broken in the air due to the reaction between the water molecule and the intercalant. Therefore, the water content in the organic solvent into which the donor-type graphite intercalation compound is to be immersed should be adjusted so as not to bring about substantially the reaction between the intercalant in the graphite intercalation compound and the water. More concretely, when the water content in the organic solvent is 200 ppm or less, the donor-type graphite intercalation compound is substantially stable. Examples of the organic solvent which can be purified so as to contain water 200 ppm or less and can dissolve noble metal salts are aromatic organic solvents, particularly preferably tetrahydrofuran, benzene, quinoline, and the like.

Examples of the noble metal salt to be dissolved in the organic solvent are salts of Ir, Os, Rh, Pd, Pt, and Ru belonging to the group VIII and Ag and Au belonging to the group Ib of the periodic table. Among them, those in the form of noble metal salt hydrates are preferable. The noble metal salt hydrates can be dissolved in an aromatic organic solvent larger in amounts than the noble metal salts containing no water of crystallization and are suitable for realizing very fine dispersion of noble metal elements. In such a case, when the water content in the noble metal salts is large, it is preferable to conduct dehydration of the aromatic organic solvent so as to make the water content 200 ppm or less after dissolving the noble metal salt therein. Then, the donor-type graphite intercalation compound is reacted with the noble metal dissolved in the aromatic organic solvent. There takes place a change of the donor-type graphite intercalation compound in the aromatic organic solvent containing the noble metal salt. The solution contains noble metal ions, anions, water molecules, and aromatic organic compound (solvent) molecules. Among them, the noble metal ions and water molecules interact with the donor-type graphite intercalation compound. The water molecules interact with the intercalant in the donor-type graphite intercalation compound so as to take out the intercalant among crystalline layers of graphite. On the other hand, the noble metal ions interact with the intercalant so as to penetrate into the crystalline layers of graphite and at the same time they are attracted to the surfaces of layers of graphite to form a colony of noble metal element thereon. These changes can be judged qualitatively from the disappearance of color specific to the noble metal ions.

In order to disperse the noble metal particles finely and uniformly, the end point is set at a point wherein the color specific to noble metal salt does not disappear, which results in making it possible to produce noble metal particles having a particle size of 20 Å or less. In order to increase the degree of dispersion of noble metal particles, it is preferable to use a donor-type graphite intercalation compound having a higher stage number so as to disperse the sites, on which noble metal particles are adsorbed, at intervals. That is, since the intercalant is coordinated in the hexagonal layers of graphite at intervals of many layers in the case of a higher stage donor-type graphite intercalation compound, the noble metal ions which interact with the intercalant and penetrate into the layers also take the positions at intervals of many layers of hexagonal layers so as to enhance the dispersion state of the noble metal particles.

Another method for enhancing the degree of dispersion of noble metal particles is to partially destroy the donor-type graphite intercalation compound by using water molecules so as to lower the concentration of the intercalant and to make the donor-type graphite intercalation compound have a higher stage number, thus limiting the sites on which the noble metal particles are adsorbed. That is, using an aromatic organic compound solution dissolving a noble metal salt hydrate, the donor-type graphite intercalation compound is reacted with the water of crystallization of the noble metal salt hydrate to remove the intercalant from the layers of graphite, followed by the reaction of the remained donor-type graphite intercalant compound with the noble metal ions. In such a case, when the amount of water is too large, the donor-type graphite intercalation compound is destroyed so as not to adsorb the noble metal particles. Therefore, it is necessary to limit the water content in the aromatic organic compound solution dissolving the noble metal salts 200 ppm or less.

The methanol fuel cell or phosphoric acid electrolyte-type fuel cell comprises a pair of electrodes placed oppositely, an electrolyte disposed between both the electrodes so as to contact with the electrodes, a fuel chamber placing neighboring to a fuel electrode of the pair of electrodes, an oxidant chamber placed neighboring to an oxidant electrode of the pair of electrodes, a fuel supplying means to the fuel chamber, and an oxidant supplying means to the oxidant chamber.

In the methanol fuel cell, an acidic electrolyte solution such as dilute sulfuric acid is usually used as electrolyte. As the oxidant, an oxygen-containing gas such as air is usually used.

In the phosphoric acid electrolyte-type fuel cell, a hydrogen-containing gas is usually used as a fuel, and an oxygen-containing gas such as air is usually used as oxidant.

The fuel cell electrode of this invention can be used as the fuel electrode and/or oxidant electrode in the fuel cells having the above-mentioned structures.

The electrode can be placed in a cell in the state of reinforced with other reinforcing material. But in such a case, it is preferable to use the reinforcing material in porous structure such as net or lattice state so as not to damage the flow of fuel or oxidant.

Figure 1:
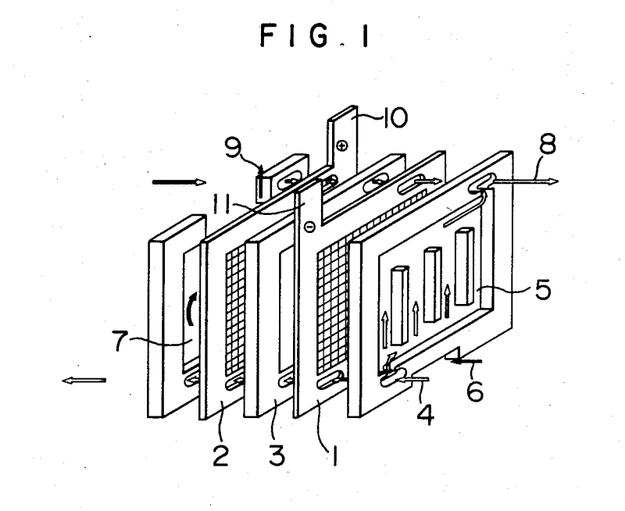
FIG. 1 is a perspective view of a fundamental structure of a unit cell of fuel cells.

The structure of fuel cell is explained more in detail referring to FIG. 1, which shows a principle of unit cell of fuel cell. In FIG. 1, numeral 1 denotes a fuel electrode, 2 an oxidant electrode, 3 an electrolyte disposed between the fuel electrode 1 and the oxidant electrode 2. A fuel chamber 5 to which a fuel 4 is sent is formed neighboring to the fuel electrode 1, and an oxidant chamber 7 to which an oxidant 6 is sent is formed neighboring to the oxidant electrode 2. In FIG. 1, a supplying means for fuel 4 and a supplying means for oxidant 6 are omitted.

As the fuel 4, methanol is used in the methanol fuel cell, and hydrogen or a hdyrogen-containing gas is used in the phosphoric acid fuel cell.

As the oxidant 6, oxygen or an oxygen-containing gas such as air is used.

In the case of the methanol fuel cell, carbon dioxide is generated as generated gas 8 at the fuel electrode 1 and water 9 is generated at the oxidant electrode 2.

In the case of the hydrazine fuel cell, nitrogen gas is generated as generated gas.

Numerals 10 and 11 show current collecting terminals.

In the fuel cell having such a structure, at least one of the fuel electrode 1 and the oxidant electrode 2 uses the electrode of this invention obtained by using as a starting material the donor-type graphite intercalation compound and carrying the catalytic active component thereon by the ion exchange reaction.

In FIG. 1, the fuel electrode 1 or the oxidant electrode 2 is composed by including the passage of fuel 4, the removing passage for generated gas 8 at the fuel electrode, and the terminals, but these passages and terminals can be produced by using an electroconductive material generally used in place of the special material obtained by using a graphite intercalation compound as a starting material. In such a case, it is preferable to make a cell casing which includes the passage of fuel 4, the passage of generated gas 8 and the terminal, and to combine the cell casing with the plate-like molded article obtained by using the graphite intercalation compound as starting material.

This invention is illustrated by way of the following Examples.

EXAMPLE 1

Figure 2:
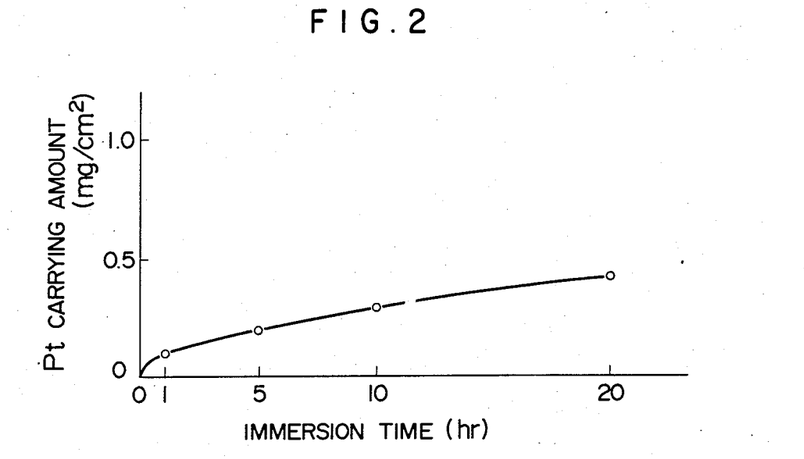
FIG. 2 is a graph showing a relationship between a platinum carrying amount and an immersion time when a graphite intercalation compound used as an electrode is immersed in a chloroplatinic acid solution according to Example 1 of this invention.

A first stage graphite intercalation compound having a golden color was synthesized by sealing carbon fiber non-woven fabric obtained by using pitch as a raw material and metallic potassium in a glass tube in vacuum at a degree of vacuum of $10^{-1}$ Pa and heating the whole glass tube at 250° C. for 8 hours. The resulting graphite intercalation compound was immersed in a tetrahydrofuran ($C_4H_8O$) solution dissolving chloroplatinic acid ($H_2PtCl_6 \cdot 6H_2O$) in a concentration of $1.8 \times 10^{-3}$ mole with water content of 35 ppm. The immersion time was changed 1 hour, 5 hours, 10 hours and 20 hours, and the platinum carrying amount was measured by the light absorption method. The results are shown in FIG. 2.

Figure 3:
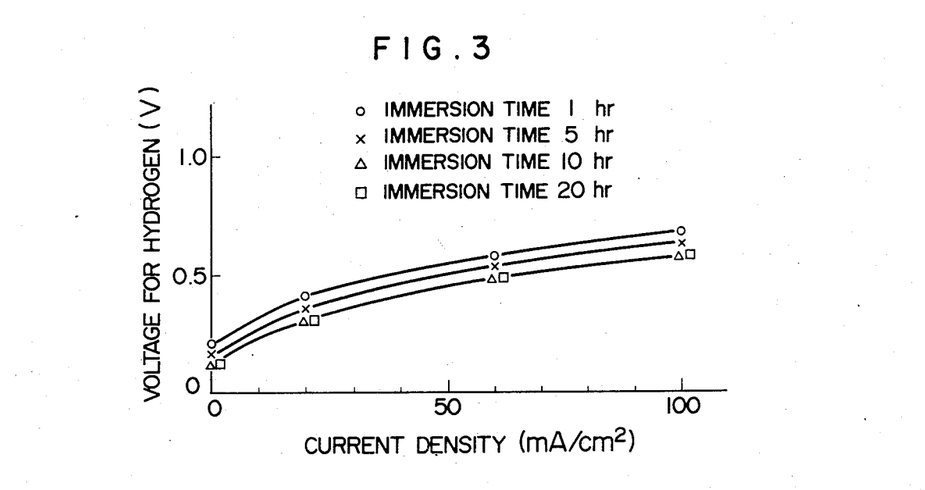
FIG. 3 is a graph showing a relationship between a current density and a voltage based on hydrogen according to Example 1 of this invention.

The thus produced electrodes carrying platinum among crystalline layers of graphite were used as a fuel electrode in methanol fuel cells. A voltage against hydrogen was measured and shown in FIG. 3 in relation to a current density. As is clear from FIG. 3, the lower the voltage against hydrogen, the higher the electrode performance.

When an electrode obtained by coating platinum catalyst on carbon paper of prior art was used, the voltage against hydrogen at the current density of 60 mA/cm$^2$ was 0.5 V or higher, even when the platinum carrying amount was 1.5 mg/cm$^2$.

Comparing the above data, the electrode of this invention is remarkably better in performance than the prior art one.

EXAMPLE 2

Figure 4:
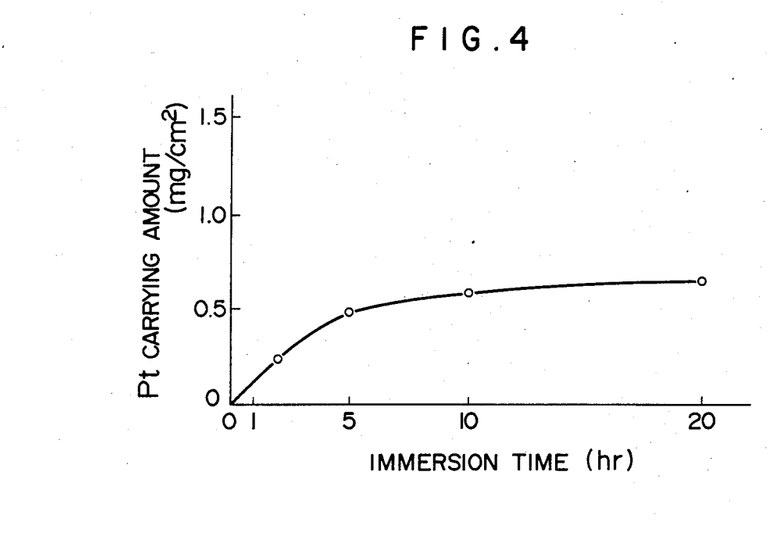
FIG. 4 is a graph showing a relationship between a platinum carrying amount and an immersion time when a graphite intercalation compound used as an electrode is immersed in a chloroplatinic acid solution according to Example 2 of this invention.

Carbon fiber woven fabric obtained by using pitch as a raw material and metallic potassium were placed in a glass tube and sealed in vacuum at a degree of vacuum of $10^{-1}$ Pa. The weight ratio of the carbon fiber woven fabric to the metallic potassium was 5:1. The glass tube was heat treated at 270° C. for 10 hours to give a dark blue second stage graphite-potassium intercalation compound. The resulting second stage graphite-potassium intercalation compound was immersed in a tetrahydrofuran ($C_4H_8O$) solution dissolving chloroplatinic acid ($H_2PtCl_6 \cdot 6H_2O$) in a concentration of $1.2 \times 10^{-4}$ mole with water content of 38 ppm for 1, 5, 10 or 20 hours to carry the platinum on the carbon fiber. The relationship between the platinum carrying amount and the immersion time at the chloroplatinic acid concentration of $1.8 \times 10^{-3}$ mole was shown in FIG. 4.

Figure 5:
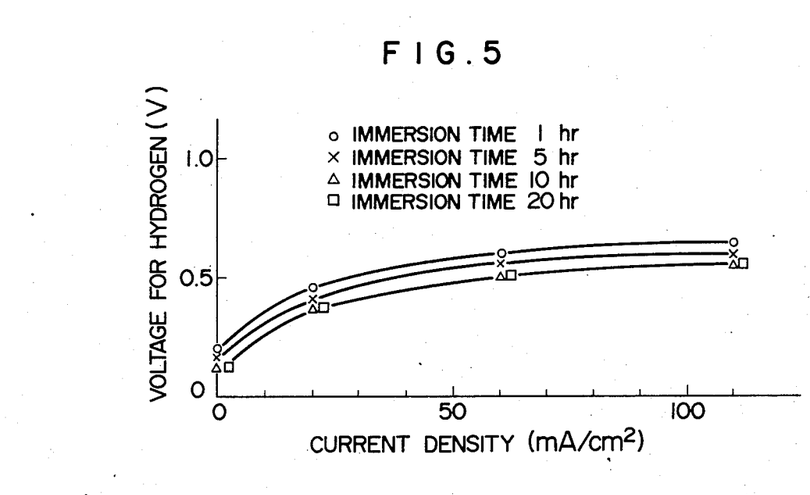
FIG. 5 is a graph showing a relationship between a current density and a voltage based on hydrogen according to Example 2 of this invention.

The thus produced electrodes were installed in methanol fuel cells as a fuel electrode and the electrode performance was measured and shown in FIG. 5.

EXAMPLE 3

Carbon fiber non-woven fabric obtained by using pitch as a raw material and metallic potassium were placed on both end portions of a glass tube and sealed in vacuum at a degree of vacuum of $10^{-3}$ Pa. The glass tube was heat treated at 270° C. to give both first stage and second stage graphite-potassium intercalation compounds. To tetrahydrofuran subjected to dehydration purification and containing water in 18 ppm, palladium chloride ($PdCl_2 \cdot 2H_2O$) was dissolved to give solutions of concentrations of $1.0 \times 10^{-3}$ mole, $1.0 \times 10^{-4}$ mole, and $1.0 \times 10^{-5}$ mole, respectively. In individual solutions, the graphite intercalation compounds were immersed for 48 hours, dried in vacuum, washed with water and distilled water, and dried in vacuum to give electrodes.

Figure 6:
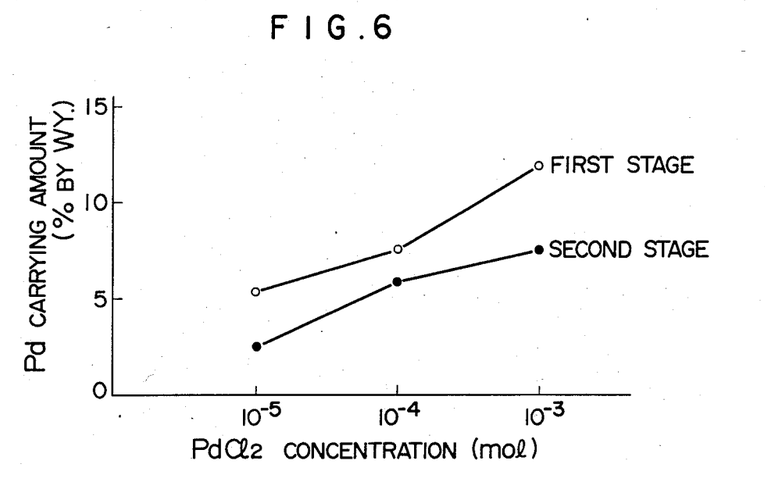
FIG. 6 is a graph showing a relationship between a palladium carrying amount and a palladium chloride concentration according to Example 3 of this invention.
Figure 7:
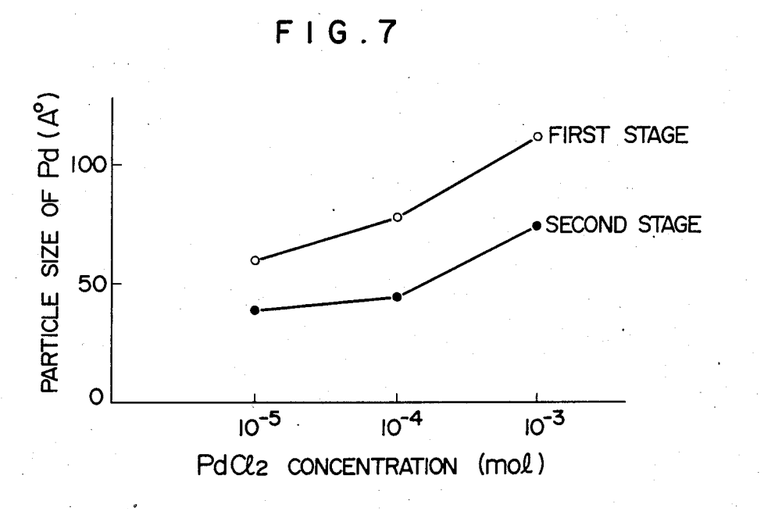
FIG. 7 is a graph showing a relationship between a palladium particle size and a palladium chloride concentration according to Example 3 of this invention.

The relationship between the palladium carrying amount and the palladium concentration was shown in FIG. 6. The relationship between the palladium concentration and the average palladium particle size was shown in FIG. 7.

Figure 8:
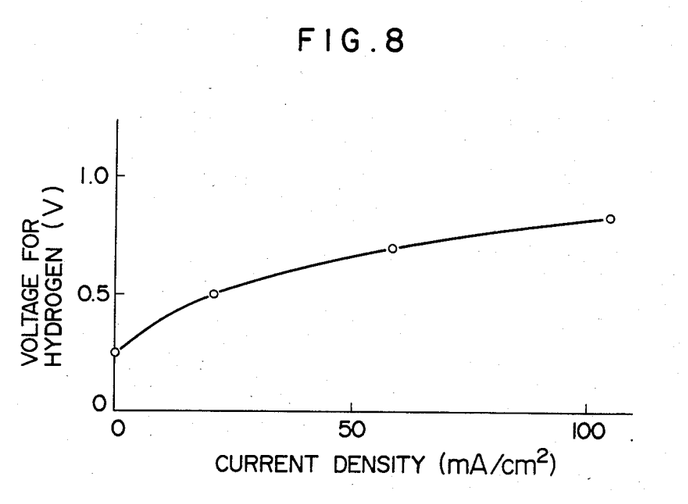
FIG. 8 is a graph showing cell performance when a fuel electrode according to Example 3 of this invention is used in a hydrazine fuel cell.

The thus produced electrode was installed in a hydrazine fuel cell as a fuel electrode and the electrode performance was measured and shown in FIG. 8.

EXAMPLE 4

Figure 9:
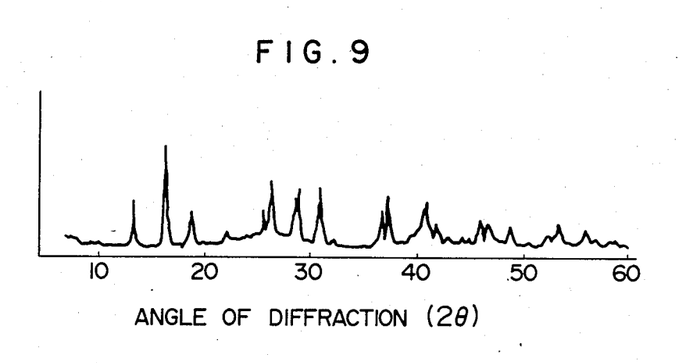
FIG. 9 is a graph showing X-ray diffraction of carbon fiber carrying a catalytic active component according to Example 5 of this invention.

Carbon fiber woven fabric obtained by using pitch as a raw material and metallic cesium were placed separately on both end portions of a glass tube and sealed in vacuum at a degree of vacuum of $10^{-2}$ Pa. The carbon fiber woven fabric portion of the glass tube was heated at 250° C. and the metallic cesium portion of the glass tube was heated at 194° C. for about 20 hours to produce a dark blue second stage graphite-cesium intercalation compound. In dehydration purified dimethoxyethene (DME), chloroplatinic acid ($H_2PtCl_6 \cdot 6H_2O$) and ruthenium chloride ($RuCl_2 \cdot xH_2O$) were dissolved and the water content was adjusted to 29 ppm. The concentrations of chloroplatinic acid and ruthenium chloride were $2.1 \times 10^{-2}$ mole, respectively. In this solution, the above-mentioned graphitecesium intercalation compound was immersed for 3 hours to carry platinum and ruthenium on the carbon fiber. X-ray diffraction of the resulting carbon fiber was shown in FIG. 9. The platinum carried on the carbon fiber woven fabric was 0.7 mg/cm$^2$.

Figure 10:
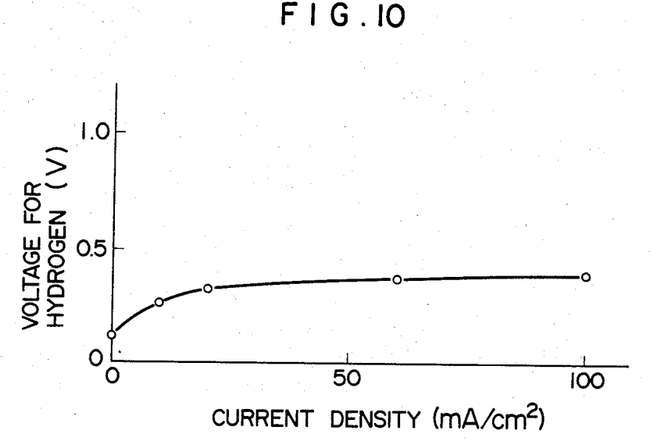
FIG. 10 ia a graph showing cell performance when a fuel electrode according to Example 5 of this invention is used in a methanol fuel cell.

The thus produced electrode was installed in a methanol fuel cell as a fuel electrode and the electrode performance was measured and shown in FIG. 10.

EXAMPLE 5

After impregnating carbon fiber non-woven fabric having a thickness of 0.8 mm with polytetrafluoroethylene in an amount of 5 mg/cm$^2$, the carbon fiber non-woven fabric thus threated and metallic potassium in weight ratio of 2:1 were placed in a glass tube and sealed in vacuum at a degree of vacuum of $10^{-2}$ Pa. The glass tube was heat treated at 250° C. for 2 hours to produce a golden first stage graphite-potassium intercalation compound. The first stage graphite intercalation compound means a graphite intercalation compound wherein an intercalant (potassium in this Example) is inserted between every crystalline layer of graphite.

The resulting graphite intercalation compound-formed carbon fiber non-woven fabric was immersed in a solution of tetrahydrofuran ($C_4H_8O$) dissolving chloroplatinic acid ($H_2PtCl_6.6H_2O$) to conduct ion exchange reaction between the graphite-potassium intercalation compound and the platinum cations.

The thus treated carbon fiber non-woven fabric was confirmed by X-ray diffraction to carry platinum catalyst on the surfaces and among crystalline layers of graphite formed on surface portions of individual carbon fibers. Further, it was also confirmed that the polytetrafluoroethylene was separately distributed among carbon fibers.

The carbon fiber non-woven fabric thus treated could maintain the water repellent properties even after being immersed in water for 1000 hours.

Example 6

After impregnating carbon fiber non-woven fabric having a thickness of 1.2 mm with polytetrafluoroethylene in an amount of 9 mg/cm², the carbon fiber non-woven fabric thus treated and metallic rubidium were placed separately on both end portions of a glass tube and sealed in vacuum at a degree of vacuum of $10^{-2}$ Pa. The glass tube as placed in an electric furnace which could control the heating temperature at two points. The carbon fiber non-woven fabric portion was heat treated at 400° C. and the metallic rubidium portion was heat treated at 208° C. for 4 hours to give a dark blue second stage graphite-rubidium intercalation compound. The second stage graphite intercalation compound means a graphite intercalation compound wherein an intercalant (rubidum in this Example) is inserted between crystalline layers of graphite at intervals of two layers.

The resulting graphite intercalation compound-formed carbon fiber non-woven fabric was immersed in a solution of tetrahydrofuran ($C_4H_8O$) dissolving potassium chloroplatinate ($K_2PtCl_4$) to conduct ion exchange reaction between the graphite intercalation compound and the platinum cations.

Measurement by X-ray diffraction, SEM observation and EDX analysis confirmed that the thus treated carbon fiber non-woven fabric carried platinum catalyst on the surfaces and among crystalline layers of graphite formed on surface portions of individual carbon fibers, and the polytetrafluoroethylene was dispersed and carried among the carbon fibers. The particle size of platinum on the surface was 35 Å.

Further, the carbon fiber non-woven fabric thus treated could maintain the water repellent properties even after being immersed in water for 1000 hours.

EXAMPLE 7

After impregnating carbon fiber woven fabric with polytetrafluoroethylene in an amount of 12 mg/cm², the carbon fiber woven fabric thus treated and metallic potassium in weight ratio of 6:1 were placed in a glass tube and sealed in vacuum at a degree of vacuum of $10^{-3}$ Pa. The glass tube was heat treated at 270° C. for 3 hours to form a dark blue second stage graphite-potassium intercalation compound.

The resulting graphite intercalation compound-formed carbon fiber woven fabric was immersed in a solution of tetrahydrofuran dissolving chloroauric acid ($H_2AuCl$) and ruthenium chloride ($RuCl_3.xH_2O$). The water content of the tetrahydrofuran solution was 21 ppm.

Measurement by X-ray diffraction, SEM observation and EDX analysis confirmed that the thus treated carbon fiber woven fabric carried gold and ruthenium catalyst obtained by the reaction between the graphite-potassium intercalation compound and the gold cations and ruthenium cations on the surfaces and among crystalline layers of graphite formed on surface portions of individual carbon fibers, and the polytetrafluoroethylene was dispersed and carried among carbon fibers.

Further, the carbon fiber woven fabric thus treated could maintain the water repellent properties even after being immersed in water for 1000 hours.

EXAMPLE 8

In a pyrex glass tube having a narrowed portion at the center, 1 g of graphite powder was placed at one end and metallic potassium was placed at another end. The glass tube was sealed in vacuum at a degree of vacuum of $10^{-5}$ Torr. The glass tube was placed in an electric furnace which could control the heating temperature at two points. The graphite powder portion was heated at 370° C. and the metallic potassium portion was heated at 250° C. for 48 hours to give a dark blue second stage graphite-potassium intercalation compound $kC_{24}$. The resulting second stage graphite-potassium intercalation compound $kC_{24}$ was transferred to a glass bottle under an argon atmosphere. In tetrahydrofuran ($C_4H_8O$) previously dehydration purified so as to make the water content 20 ppm, chloroplatinic acid ($H_2PtCl_6.6H_2O$) was dissolved in an amount of $1.4\times10^{-4}$ mole. The tetrahydrofuran solution was added dropwise to the glass bottle until the orange color specific to the chloroplatinic acid did not disappear, followed by standing still for 24 hours. Then, the resulting graphite was filtered, washed with distilled water until the potassium chloride deposited on the surface disappeared, followed by drying in vacuum.

Figure 11:
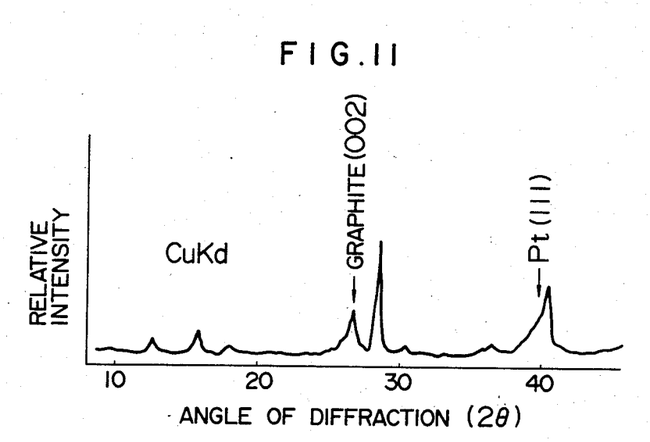
FIG. 11 is a graph showing X-ray diffraction of graphite particles carrying platinum obtained in Example 8.

X-ray diffraction of the resulting material is shown in FIG. 11. As is clear from FIG. 11, platinum element is present in the internal portions and on the surface portion of the graphite material. Further, TEM image revealed that the particle size of platinum particles dispersed in the graphite material was about 10 Å. In addition, the amount of platinum dispersed in the graphite material was 1.5% by weight.

EXAMPLE 9

In a pyrex glass tube, a mixture of 1 g of graphite powder and 0.8 g of metallic potassium were placed and sealed in vacuum at a degree of vacuum of $10^{-4}$ Torr. The pyrex glass tube was placed in a constant temperature bath at 250° C. for 24 hours for heat treatment to produce a golden first stage graphite-potassium intercalation compound $kC_8$. The resulting first stage graphite-potassium intercalation compound was transferred to a glass bottle under an argon atmosphere. A solution prepared by dissolving sodium-palladium chloride ($PdCl_2.2NaCl.3H_2O$) in a concentration of $1.4\times10^{-3}$ mole in tetrahydrofuran ($C_4H_8O$) previously prepared by dehydration purification so as to make the water content 200 ppm was added dropwise to the glass bottle until the darkish red color specific to the sodium-palladium chloride did not disappear, followed by standing still for 24 hours. Then, the resulting graphite was filtered, washed with water, and dried by using a vacuum drier.

X-ray diffraction pattern and TEM image revealed that palladium particles with a particle size of several tens angstroms were uniformly dispersed on the surfaces of the graphite.

EXAMPLE 10

In a pyrex glass tube having a narrowed portion the center, a graphite plate grown up in the air was placed at one end and rubidium (Rb) was placed at another end. The glass tube was sealed in vacuum at a degree of vacuum of $10^{-4}$ Torr. The glass tube was heated so as to heat the graphite portion at 400° C. and the rubidium portion at 210° C. for 24 hours to produce a second stage graphite-rubidium intercalation compound $RbC_{24}$. The resulting second stage graphite-rubidium intercalation compound was transferred to a glass bottle under an argon atmosphere. A solution prepared by dissolving ruthenium chloride ($RuCl_3.xH_2O$) in a concentration of $1.8 \times 10^{-4}$ mole in quinoline ($C_9H_7N$) previously prepared by dehydration purification so as to make the water content 30 ppm was added dropwise to the glass bottle until the brown color specific to the ruthenium chloride did not disappear, followed by standing still for 10 hours. Then the graphite plate was taken out and washed sufficiently with water.

X-ray diffraction pattern and TEM image revealed that ruthenium particles with a particle size of 15 Å were dispersed uniformly on the surface and interior of the graphite plate.

EXAMPLE 11

A graphite powder was placed in the central portion of a pyrex glass tube and rubidium (Rb) and potassium (K) were placed separately at end portions of the glass tube. The glass tube was sealed in vacuum at a degree of vacuum of $10^{-4}$ Torr. The rubidium portion was heated at 220° C., the graphite portion at 210° C. and the potassium portion at 240° C. for 48 hours to produce a graphite-alkali metal intercalation compound $K_xRb_{1-x}C_8$. The resulting graphite intercalation compound was transferred to a glass bottle under an argon atmosphere. A solution prepared by dissolving chloroplatinic acid ($H_2PtCl_6.6H_2O$) in a conentration of $2.3 \times 10^{-4}$ mole in tetrahydrofuran ($C_4H_8O$) previously prepared by dehydration purification so as to make the water content 20 ppm was added dropwise to the glass bottle until the orange color specific to the chloroplatinic acid did not disappear, followed by standing still for 24 hours. Then the graphite material was filtered, washed with water and dried under vacuum.

X-ray diffraction pattern and TEM image revealed that platinum particles with a maximum particle size of 20 Å were dispersed on the surface and interior of the graphite material.

As explained in detail above, the fuel cell electrode of this invention directly carries the catalytic active component between the graphite crystalline layers and on the surfaces of graphite intercalation compound. Therefore, it is not necessary to use a binder unlike the prior art electrodes. Further, it is not necessary to use a carrier. In addition, since the catalytic active component is carried on the graphite intercalation compound in place of the intercalant, the dispersibility of the catalytic active component is good.

The fuel cells containing such electrodes therein show higher cell performance than those containing prior art catalyst coating type electrodes therein.

What is claimed is:

1. A fuel cell electrode comprising at least one catalytic active component selected from noble metals belonging to the group I and group VIII in the periodic table carried on surfaces and among lamellar crystalline layers of a porous electroconductive substrate made from a donor-type graphite intercalation compound.

2. A fuel cell electrode according to claim 1, wherein the donor-type graphite intercalation compound is at least one member selected from the group consisting of a graphite-alkali metal intercalation compound, a graphite-alkaline earth metal intercalation compound, and a mixture thereof.

3. A fuel cell electrode according to claim 1, wherein the porous electroconductive substrate is constructed by carbon fiber having a graphitized layer structure.

4. A fuel cell electrode according to claim 3, wherein the carbon fiber is carbon fiber non-woven fabric.

5. A fuel cell electrode according to claim 3, wherein the carbon fiber is carbon fiber woven fabric.

6. A fuel cell electrode according to claim 3, wherein the carbon fiber is obtained by using pitch as a raw material.

7. A fuel cell electrode according to claim 1, wherein the catalytic active component is carried in an amount of 0.1 to 2 mg per $cm^2$ of apparent surface area of the electrode.

8. A fuel cell electrode according to claim 1, wherein the porous electroconductive substrate is in the form of a plate and is able to pass a fuel or oxidant.

9. A fuel cell electrode according to claim 1, wherein the group I noble metal is a group Ib noble metal.

10. A fuel cell electrode according to claim 1, wherein the noble metals are selected from the group consisting of Au, Ag, Ru, Rh, Pd, Os, Ir and Pt.

11. A fuel cell electrode according to claim 1, wherein said noble metals are directly carried on surface and among lamellar crystalline layers of the porous electroconductive substrate without use of a binder.

12. A fuel cell electrode according to claim 11, wherein the noble metals are directly carried on said surfaces and among crystalline layers by ion exchange reaction and reduction.

13. A fuel cell electrode according to claim 1, said electrode having a single-layer structure.

14. A fuel cell electrode accordin to claim 1, wherein the thickness of said porous electroconductive substrate is about 0.1 to 2 mm.

15. A fuel cell electrode according to claim 1, wherein the porous electroconductive substrate has a pore size of 1–50 μm and a porosity of 85–95%.

16. A fuel cell electrode according to claim 15, wherein the noble metal is carried on the substrate in an amount of 0.1 to 2 mg per $cm^2$ of apparent surface area of the electrode.

17. A fuel cell electrode according to claim 1, wherein the donor-type graphite intercalation compound is a second stage donor-type graphite intercalation compound.

18. A fuel cell electrode according to claim 1, wherein said electrode is reinforced with a reinforcing material.

19. A fuel cell electrode according to claim 1, wherein said electrode is formed by contacting said porous electroconductive substrate made from said donor-type graphite intercalation compound with said at least one catalytic active component selected from noble metals belonging to the group I and group VIII in the periodic table so as to carry the catalytic active component on surfaces and among lamellar crystalline layers of the donor-type graphite intercalation compound.

20. A fuel cell electrode comprising at least one catalytic active component selected from noble metals belonging to the group I and group VIII in the periodic table carried on surfaces and among lamellar crystalline layers of a porous electroconductive substrate made from a donor-type graphite intercalation compound, and all the surfaces except for the catalytic active component being covered with a water repellent substance.

21. A fuel cell electrode according to claim 20, wherein the water repellent substance is polytetrafluoroethylene.

22. In a fuel cell comprising a pair of electrodes and an electrolyte therebetween, the improvement comprising wherein at least one of the pair of electrodes comprises at least one catalytic active component selected from noble metals belonging to the group I and group VIII in the periodic table carried on surfaces and among lamellar crystalline layers of a porous electroconductive substrate made from a donor-type graphite intercalation compound.

* * * * *